United States Patent
Przygienda

[11] Patent Number: 5,966,380
[45] Date of Patent: Oct. 12, 1999

[54] PROCESSING OF TLV BASED LINK-STATE PACKETS

[75] Inventor: Antoni B. Przygienda, Rockville, Md.

[73] Assignee: FORE System, Inc., Warrendale, Pa.

[21] Appl. No.: 08/692,007

[22] Filed: Aug. 2, 1996

[51] Int. Cl.$^6$ .................................................. H04Q 11/04
[52] U.S. Cl. ..................... 370/389; 370/237; 370/248; 370/471
[58] Field of Search ..................... 370/248, 392, 370/394, 395, 397, 401, 402, 408, 389, 218, 237, 349, 471

[56] References Cited

U.S. PATENT DOCUMENTS

| | | | |
|---|---|---|---|
| 5,430,727 | 7/1995 | Callon | 370/401 |
| 5,530,806 | 6/1996 | Condon et al. | 370/397 |
| 5,557,607 | 9/1996 | Holden | 370/395 |
| 5,572,512 | 11/1996 | Cuttler, Jr. et al. | 370/248 |

Primary Examiner—Douglas W. Olms
Assistant Examiner—Shick Hom
Attorney, Agent, or Firm—Ansel M. Schwartz

[57] ABSTRACT

The method includes the steps of receiving new information about the node. Then, there is the step of comparing the new information about the node with old information about the node. Then, there is the step of updating the old information with the new information by incrementing the old information with the new information. A method for monitoring an other node. The method includes the steps of storing an old packet from an other node having at least a first element in a memory of a node. Then, there is the step of receiving a new packet from the other node having at least a first element by the node. Next there is the step of comparing the first element of the new packet with the first element of the old packet. Then there is the step of inserting the first element of the new packet in an order which is in front of the first element of the old packet in the memory if the first element of the new packet is different than the first element of the old packet.

2 Claims, 10 Drawing Sheets

PROCESSING OF TLV BASED LINK-STATE PACKETS

FIELD OF THE INVENTION

The present invention relates to telecommunication networks. More specifically, the present invention relates to the processing of TLV based link-stated packets.

BACKGROUND OF THE INVENTION

With the increasing use and complexity of global networks for commercial and public purposes, link-state routing algorithms, being the main-stream of routing protocols today, grow more and more complex. One of the examples therefore is the P-NNI (ATM Forum, PNNI Specification Ver. 1.0, 1996), incorporated by reference herein, routing protocol specified by the ATM Forum body. Link-state routing protocols relied to transport topology information so far mostly on fixed-format packets that could be processed in an inexpensive manner. With the upcoming requirement of future extensibility of such protocols type-length-value (TLV) encoded packets are evolving. Parsing of such packets becomes very expensive. This invention presents a novel approach to process such packets in an incremental, fast way.

Networking of computers introduced several problems such as naming, addressing and routing (J. Schoch, Internetwork naming, addressing and routing. In IEEE Proc. Compcon, 1978) and naturally different solutions thereof. Recently, the focus in routing is shifting towards dynamic or state-adaptive routing (G. Ash, J. Chen, A. Frey, B. Huang, C. Lee, G. McDonald. Real-time network routing in the AT&T network-improved service quality at lower cost. In Globecom. AT&T Bell Laboratories, 1992; R. Callon, R. Guerin, E. Hoffman, J. Jeffords, G. Swallow. P-NNI routing hierarchy; overview and examples. P-NNI Working Group, March 1994). Such a routing does, beside saving a lot of configuration work, respond quickly to changes of available resources in the network and link failures. Moreover, this kind of routing becomes more and more of a necessity when introducing B-ISDN network technologies such as ATM (Jean-Yves Le Boudec, The Asynchronous Transfer Mode: A Tutorial. Computer Networks and ISDN Systems, 1992) that start to blur the boundary between carrier networks and privately operated computer networks.

Several design solutions exist for dynamic routing in computer networks and are still under development, distance vector (L. Ford and D. Fulkerson, Flows in Networks. Princeton University Press, 1962) and link-state (J. M. McQuillan, I. Richer, E. C. Rosen, ARPANET routing algorithms improvements. BBN Technical Report 3803, April 1978) oriented being the well-known ones. Due to its advantages in context of routing with quality of service requirements, link-state protocols are used as basics for emerging technologies such as ATM. The basic idea of link state routing protocols is that each node sends local topology information to its neighbors (R. Perlman, "Interconnections", Addison-Wesley, 1992, ISBN 0-201-56322-0). This information is propagated then using sophisticated 'flooding' mechanisms through the network. As the result of such a process, every node in the network contains a view of the whole network topology in the so called "Topology Database". Newer link-state routing protocols incorporate a concept of 'hierarchy', where parts of the network collapse into a logical node in the view of distant nodes. The generation and flooding of information is repeated each time a node sees a significant change in available local resources. The distributed pieces of topology information, so called link state up-dates (LSU) or link state elements, carry a unique identifier and a version number increasing when the information inside of such an LSU is up-dated. Additionally, to prevent this process from being triggered too often, a dampening function controls the thresholds holding back non-significant changes. The topology database resulting from the execution of the 'flooding' mechanism between nodes is used to compute routes that are requested by users then to reach desired destinations. Such routes are used e.g. in forwarding of packets or routing of call setups in connection-oriented networks.

Modern routing protocols, such as PNNI, following the trend towards extensibility for future requirements, abandon more and more fixed packet formats and start to use TLV (type-length-value) encoded packet schemes. The type describes the fixed part of the TLV transmitted and the length indicates the offset in the packet where the next TLV starts. In case where the length exceeds the length of the fixed part of the TLV, embedded TLVs are present. Generally, TLV encoded packets transferring topology information in modern routing protocols can be interpreted as representations of lists of arbitrary elements embedded in lists recursively. This approach, albeit very flexible, presents increased processing load in terms of CPU required. FIG. 1a visualizes two TLVs, first of them embedding two other TLVs.

The solution presented introduces a novel algorithm that allows to process changes to linked lists of arbitrary elements, possibly nested recursively, in an incremental manner. TLV encoded packets transferring topology information in modern routing protocols can be interpreted as representations of such structures. Because topology packets more often include changes in the content of list elements than changes to the list structure itself, it becomes less and less convenient to abandon the processed version of the previous list and fully process the structure of the new version. An incremental update algorithm introduced here, recognizing the changes in the contents of elements without unnecessarily deleting old elements, improves the performance of the protocol significantly.

SUMMARY OF THE INVENTION

The present invention pertains to a method for monitoring a node. The method comprises the steps of receiving new information about the node. Then, there is the step of comparing the new information about the node with old information about the node. Then, there is the step of updating the old information with the new information by incrementing the old information with the new information.

The present invention pertains to a method for monitoring an other node. The method comprises the steps of storing an old packet from an other node having at least a first element in a memory of a node. Then, there is the step of receiving by the node a new packet from the other node having at least a first element. Next there is the step of comparing the first element of the new packet with the first element of the old packet. Then there is the step of inserting the first element of the new packet in an order which is in front of the first element of the old packet in the memory if the first element of the new packet is different than the first element of the old packet.

The present invention pertains to a node for a communication network. The node comprises a mechanism for transmitting information about itself to an other node. The node comprises a mechanism for receiving information about the other node. The node also comprises a mechanism for maintaining information about itself and the other node. The maintaining mechanism is connected to the transmitting mechanism and the receiving mechanism. The node comprises a mechanism for comparing new information, received from the other node to old information previously received from the other node and updating the old information with the new information. The maintaining mechanism is connected to the comparing mechanism.

The present invention pertains to a system for communication. The system comprises a network of nodes. Each node is connected to at least one other node and in communication with all other nodes through the nodes to which it is connected. Each node comprises a mechanism for communicating with an other node. Each node also comprises a mechanism for maintaining information about itself and the other node. The maintaining mechanism is connected to the communicating mechanism. Also, each node comprises a mechanism for comparing new information received from the other node to old information previously received from the other node and updating the old information with the new information by incrementing the old information with the new information.

The present invention pertains to a node for a communication network. The node comprises a mechanism for transmitting information about itself to an other node. The node comprises a mechanism for receiving information about the other node. The node also comprises a mechanism for maintaining information about itself and the other node. The maintaining mechanism is connected to the transmitting mechanism and the receiving mechanism. The node comprises a mechanism for comparing new information, received from the other node to old information previously received from the other node and updating the old information with the new information. The maintaining mechanism is connected to the comparing mechanism.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1A:
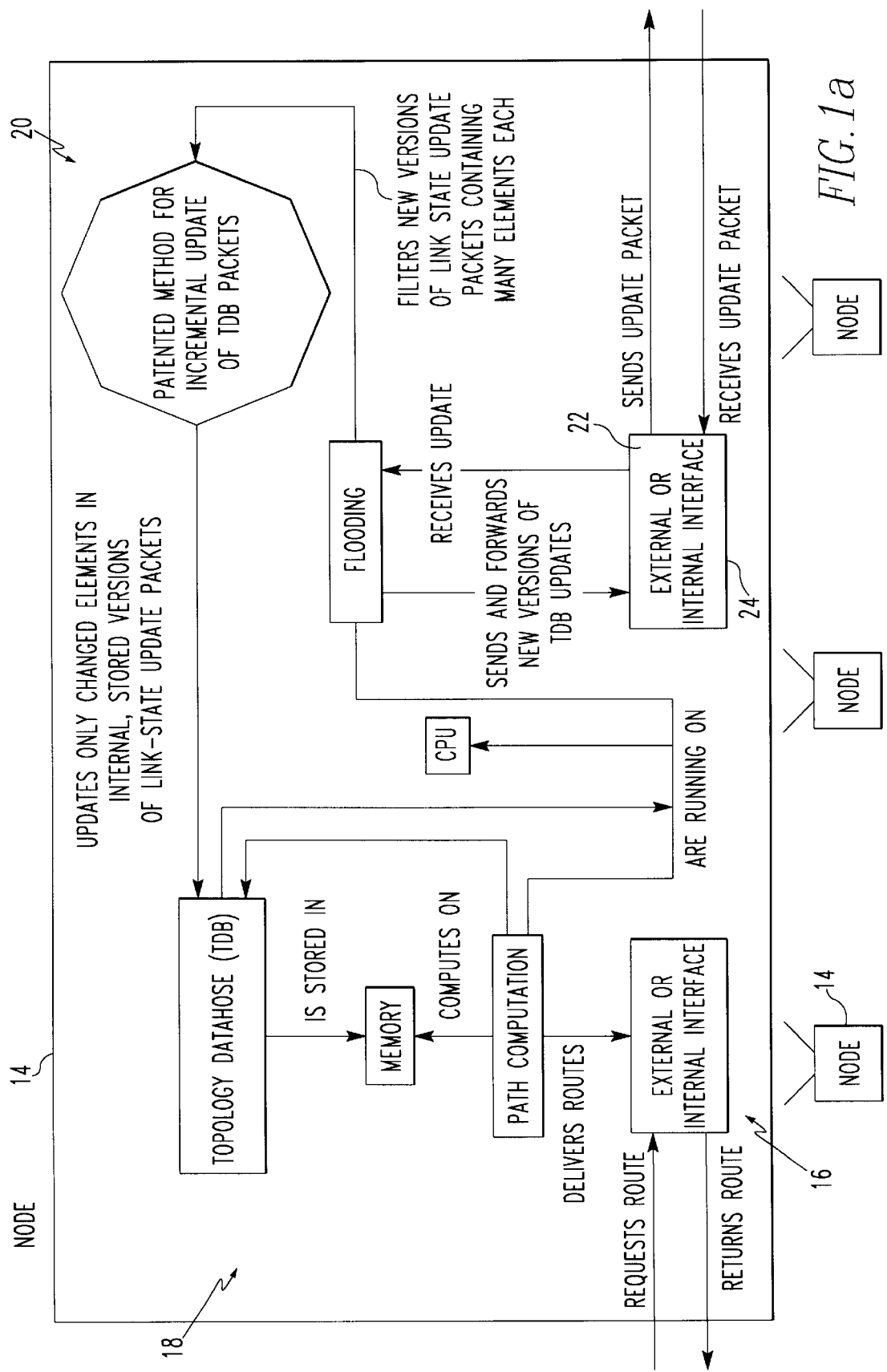
FIG. 1a is a schematic representation of a node of the present invention.
Figure 1B:
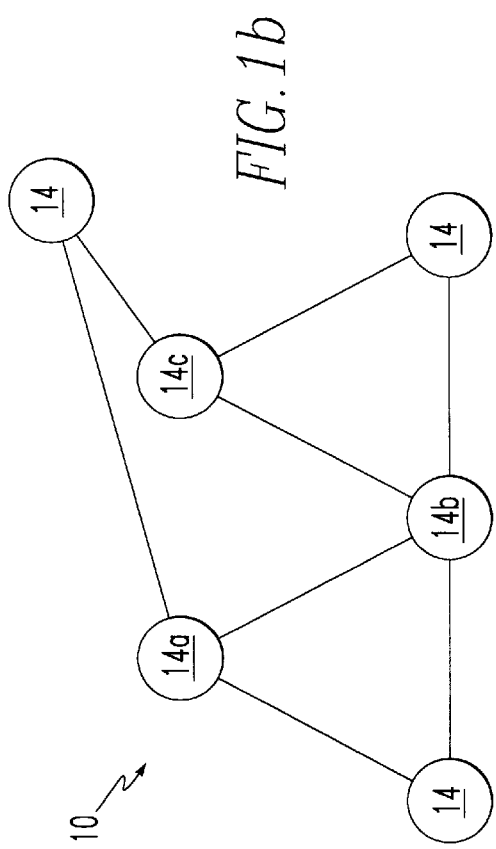
FIG. 1b is a schematic representation of a system with a plurality of nodes.

Referring now to the drawings wherein like reference numerals refer to similar or identical parts throughout the several views, and more specifically to FIG. 1b thereof, there is shown a system 10 for communication. The system 10 comprises a network 12 of nodes 14. Each node 14, as shown in FIG. 1b, is connected to at least one other node 14 and in communication with all other nodes 14 through the nodes 14 to which it is connected. Each node 14 comprises a mechanism 16 for communicating with an other node 14. Each node 14 also comprises a mechanism 18 for maintaining information about itself and the other node 14. The maintaining mechanism 18 is connected to the communicating mechanism. Also, each node 14 comprises a mechanism 20 for comparing new information received from the other node 14 to old information previously received from the other node 14 and updating the old information with the new information by incrementing the old information with the new information.

Preferably, the communicating mechanism 16 comprises a mechanism 22 for transmitting information about itself to the other node 14. Also, the communicating mechanism 16 preferably comprises a mechanism 24 for receiving information about the other node 14. The maintaining mechanism 18 is connected to the transmitting mechanism 22 and the receiving mechanism.

The present invention pertains to a communication network 12. The communication network 12 comprises a first node 14a. The first node 14a comprises a mechanism 16 for communicating with a second node 14b to which it is connected. The first node 14a also comprises a mechanism 18 for maintaining information about itself, the second node 14b and a third node 14c. The maintaining mechanism 18 is connected to the communicating mechanism. Also, the first node 14a comprises a mechanism 20 for comparing new information received from the second node 14b to old information previously received from the second node 14b and updating the old information with new information by incrementing the old information with the new information.

The communication network 12 also comprises a second node 14b connected to the first node 14a. The second node 14b comprises a mechanism 16 for communicating with the first node 14a and a third node 14c to which it is connected. The second node 14b also comprises a mechanism 18 for maintaining information about itself and the first and third node. The maintaining mechanism 18 is connected to the communicating mechanism. The second node 14b also comprises a mechanism 20 for comparing new information received from the first or third node to old information previously received from the first or third node, respectively, and updating the old information with new information by incrementing the old information with the new information.

The communication network 12 comprises a third node 14c connected to the second node 14b and in communication with the first node 14a through the second node 14b. The third node 14c comprises a mechanism 16 for communicating with the second node 14b. The third node 14c comprises a mechanism 18 for maintaining information about itself from, the first node 14a and the second node 14b. The maintaining mechanism 18 is connected to the communicating mechanism. Also, the third node 14c comprises a mechanism 20 for comparing new information received from the second node 14b to old information previously received from the second node 14b and updating the old information from with new information by incrementing the old information with the new information. Preferably, each node 14 is a switch or a router.

The present invention pertains to a node 14 for a communication network 12. The node 14 comprises a mechanism 22 for transmitting information about itself to an other node 14. The node 14 comprises a mechanism 24 for receiving information about the other node 14. The node 14 also comprises a mechanism 18 for maintaining information about itself and the other node 14. The maintaining mechanism 18 is connected to the transmitting mechanism 22 and the receiving mechanism 24. The node 14 comprises a mechanism 20 for comparing new information, received from the other node 14 to old information previously received from the other node 14 and updating the old information with the new information. The maintaining mechanism 18 is connected to the comparing mechanism 20.

Preferably, the transmitting mechanism 22 comprises a mechanism 22 for transmitting TLV packet 30 information about itself to an other node 14. The receiving mechanism 24 preferably comprises a mechanism 24 for receiving TLV packet 30 information about the other node 14. The maintaining mechanism 18 preferably comprises a mechanism 18 for maintaining TLV packet 30 information about itself and the other node 14. The comparing mechanism 20 preferably comprises a mechanism 20 for comparing new TLV packet 30 information received from the other node 14 to old TLV packet 30 information previously received from the other node 14 and updating the old TLV packet 30 information with the new TLV packet 30 information.

The present invention pertains to a method for monitoring a node 14. The method comprises the steps of receiving new information about the node 14. Then, there is the step of comparing the new information about the node 14 with old information about the node 14. Then, there is the step of updating the old information with the new information by incrementing the old information with the new information.

Preferably, the updating step includes the step of updating the old information with the new information by incrementing the old information with the new information where the new information is different from the old information. The updating step preferably also includes the step of inserting new information into the old information where the new information is different than the old information. Additionally, the updating step preferably includes the step of deleting all information which is not in the new information. The updating step preferably also includes the step of rearranging the old information to correspond with the order of the new information.

Figure 2:
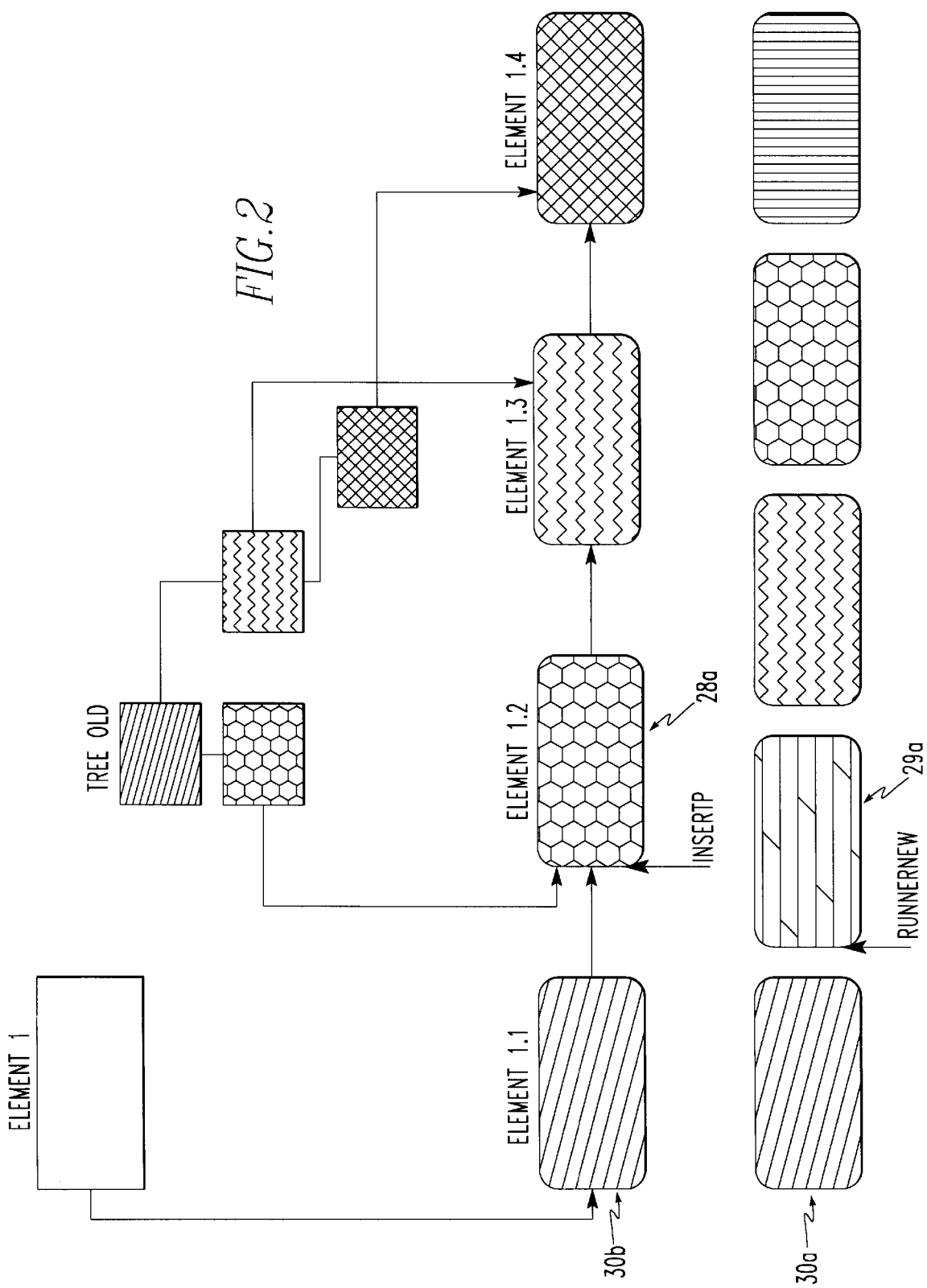
FIG. 2 is a schematic representation of an old packet compared to a new packet where the element compared is a new element with respect to the old packet.
Figure 3:
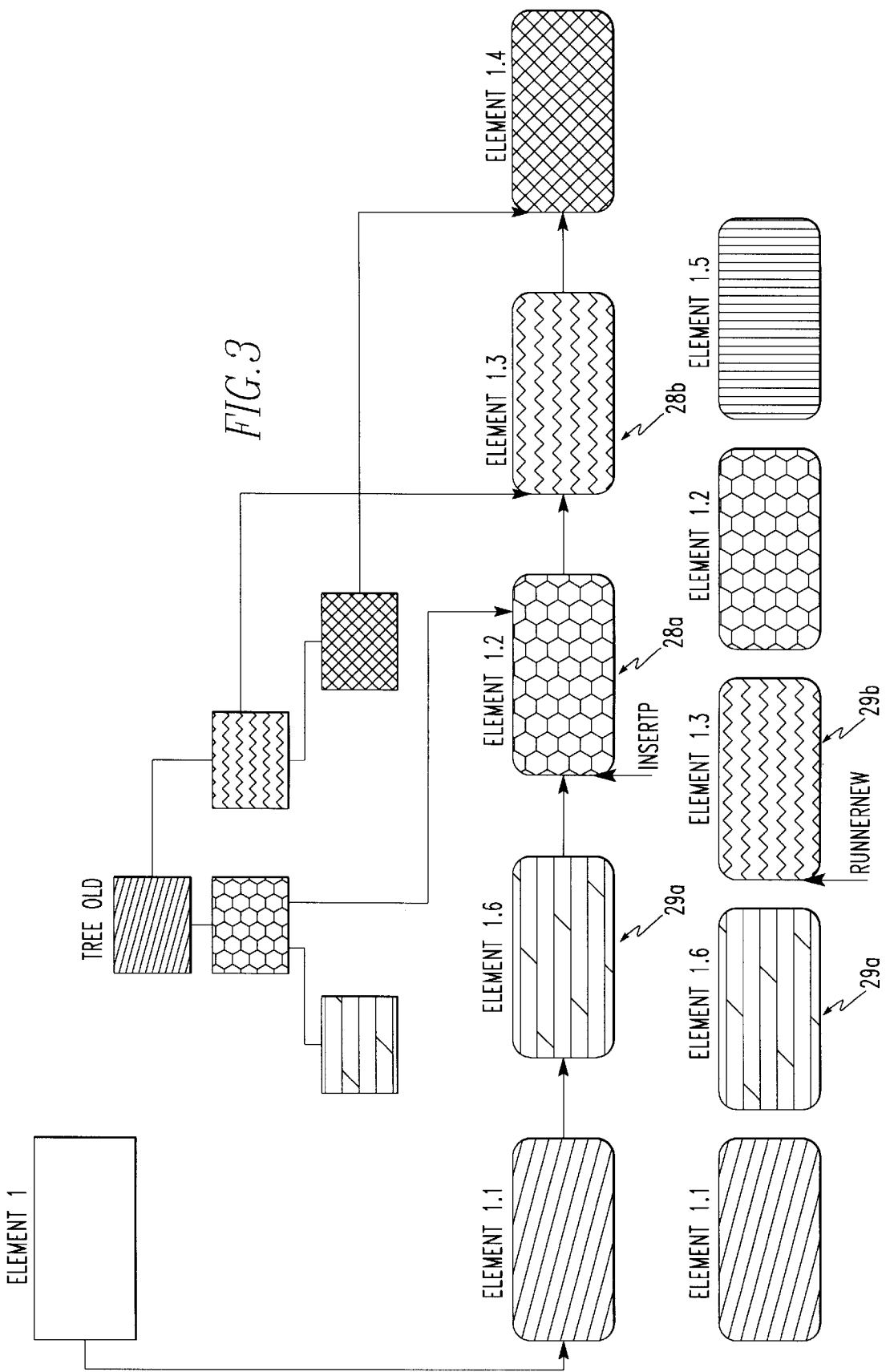
FIG. 3 is a schematic representation of an old packet compared to a new packet where there is the same element in the new packet as the old packet but at a new position.

The present invention pertains to a method for monitoring an other node 14. The method comprises the steps of storing an old packet 30b from an other node 14 having at least a first element 28a in a memory of a node 14. Then, there is the step of receiving a new packet 30a from the other node 14 having at least a first element 29a by the node 14, as shown in figure 1b. Next, there is the step of comparing the first element 29a of the new packet 30a with the first element 28a of the old packet, as shown in FIG. 2. Then, there is the step of inserting the first element 29a of the new packet 30a in an order which is in front of the first element 28a of the old packet 30, as shown in FIG. 3, in the memory if the first element 29a of the new packet 30a is different than the first element 28a of the old packet 30b.

Figure 4:
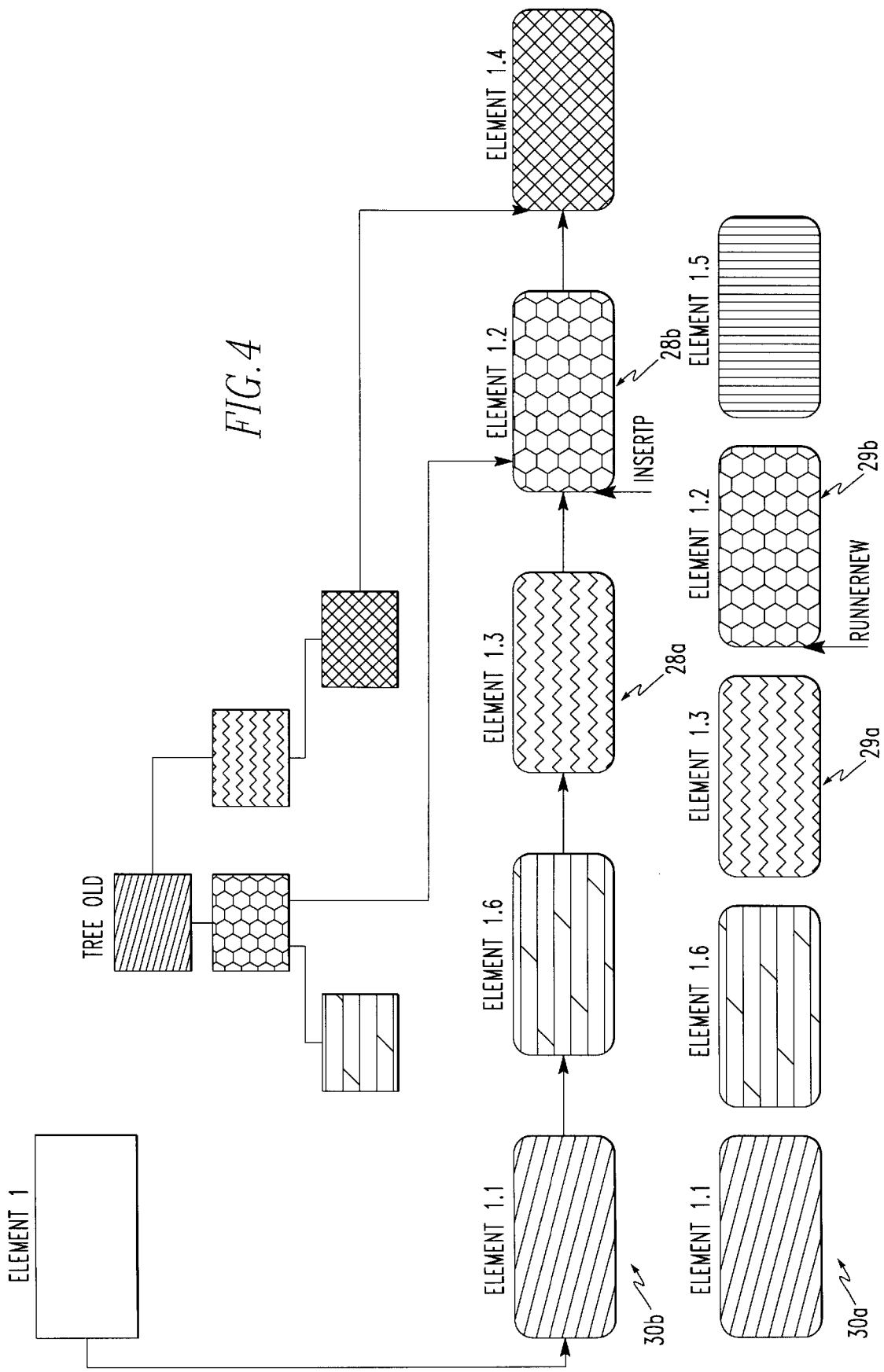
FIG. 4 is a schematic representation of an old packet compared to the new packet where the element compared is the same at the same position.

Preferably, the old packet 30 has at least a second element 28b which is in an order that follows the first element 28a of the old packet 30 in the memory, and the new packet 30 has at least a second element 29b which is in order that follows the first element 29a of the new packet 30a. Additionally, after the comparing step there is the step of comparing a second element 29b of the new packet 30a with the second element 28b of the old packet 30b, as shown in FIG. 4.

Figure 6:
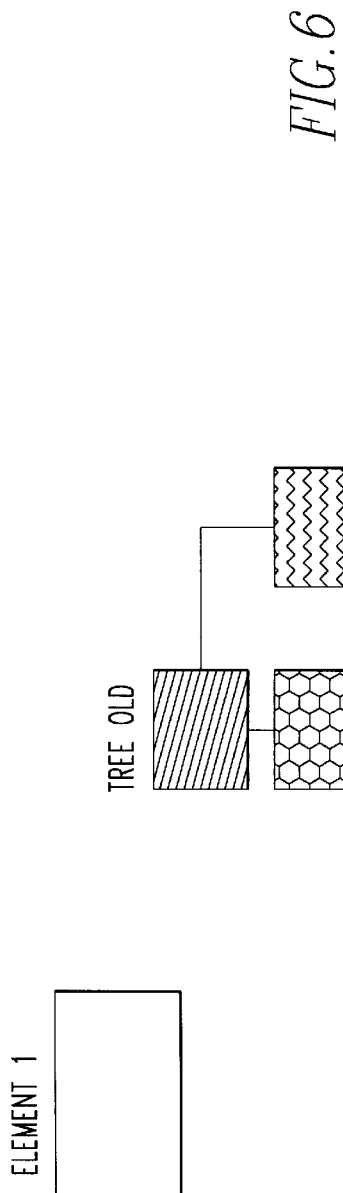
FIG. 6 is a schematic representation of an old packet compared to a new packet where the elements in the old packet which do not appear in the new packet are at the end of the old packet and are to be deleted.
Figure 6:
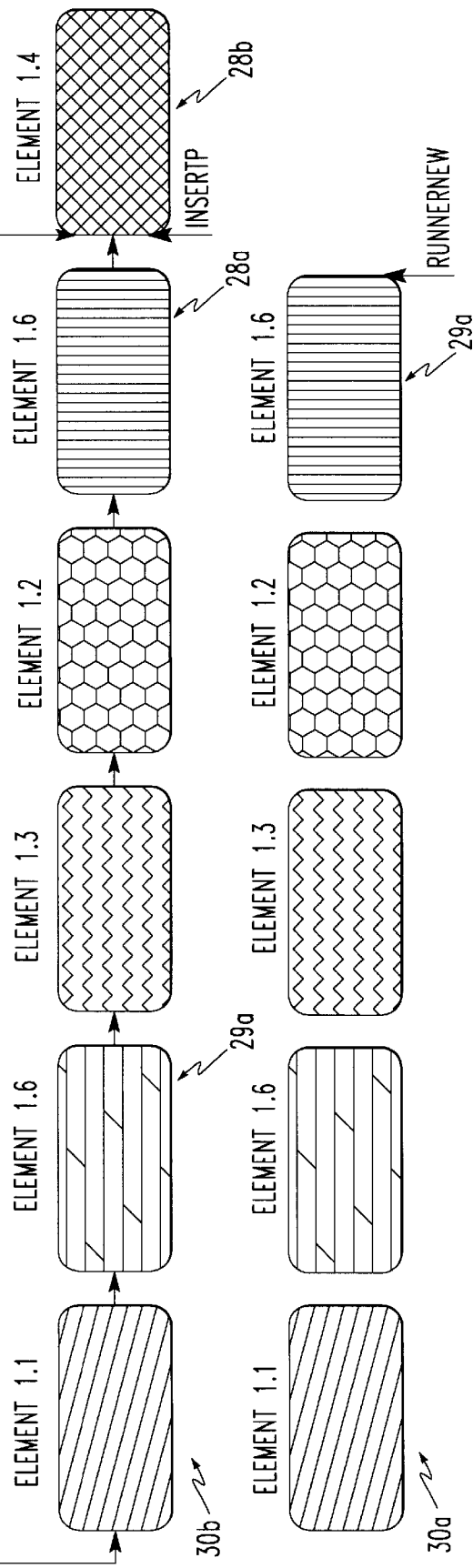

Alternatively, the old packet 30b has at least a second element 28b which is in an order that follows the first element 28a of the old packet 30b in the memory, and the new packet 30a has no additional element 29b which is in an order that follows a first element 29a, as shown in FIG. 6. Also, after the comparing step, there is the step of deleting the second element 28b of the old packet 30a from the memory. Alternatively, the storing step preferably includes the step of storing an old TLV packet 30 from the other node 14. Furthermore, the receiving step includes the step of receiving a new TLV packet 30 having at least a first element 28a by the node 14. Also, the comparing step includes the step of comparing the first element 28a of the new TLV packet 30 with the first element 28a of the old TLV packet. Furthermore, the inserting step includes the step of inserting the first element 28a of the new TLV packet 30 in an order which is in front of the first element 28a of the old TLV packet 30 in the memory of the first element 28a of the new TLV packet 30 is different than the first element 28a of the old TLV packet. As can be seen from the previous discussion, the first element and second element can refer to any element of the packet.

Figure 1C:
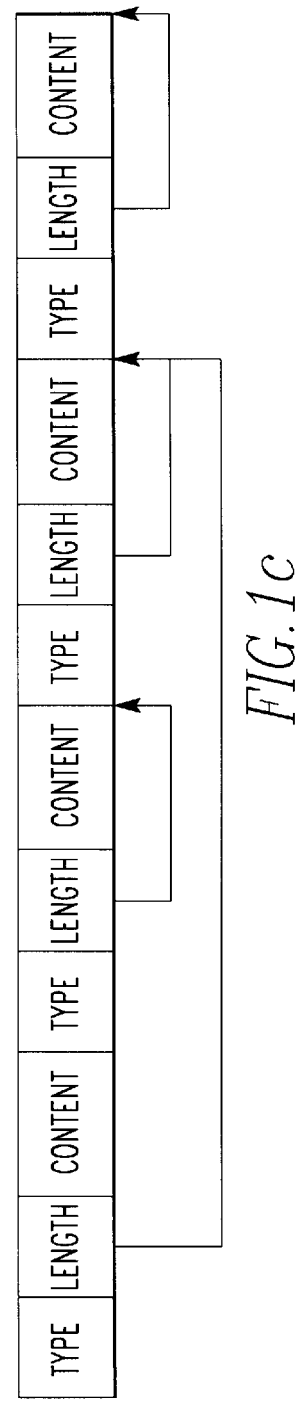
FIG. 1c is an example of a TLV packet.
Figure 1D:
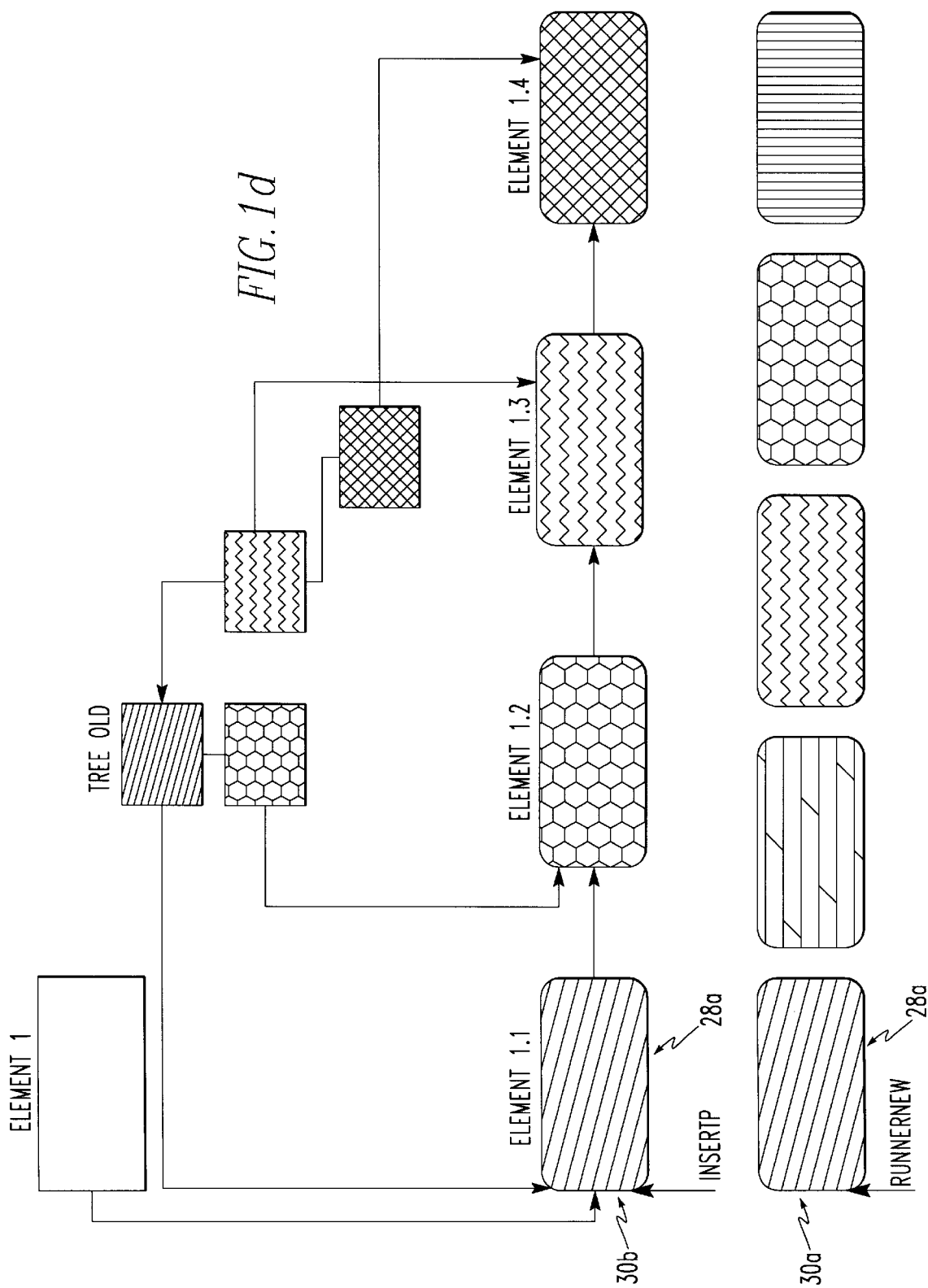
FIG. 1d is a schematic representation of an old packet compared to a new packet where the element compared is the same at the same position.

The system 10 applies in a network of nodes (such as routers or switches) using link-state routing and visualized in FIG. 1c. Such networks are widely used today. According to the figure, each router/switch maintains a topology database to enable efficient routing of arriving packets or connection setup requests. The achieved quality of applied routing depends on each node's ability to instantaneously adapt its decisions based on the view of the current topology in the case of alterations of the state of links like outage or change in available link resources. In this case, neighboring routers will flood the network with LSU messages representing their current topology. The generation and processing of 'flooding' packets in link-state routing protocols is a very time critical issue. Incoming packets must be processed and stored in the topology database if necessary and flooded on as soon as possible if appropriate.

In general, modern link-state routing shows the following characteristics:

1) Frequency of generating routing updates in a single node is relatively low compared to the amount of LUSs generated in the whole of the network.

2) Packets are encoded as 'lists-of-lists'. This is typically achieved but not restricted to through TLV formatting.

3) The node receiving packets from other nodes must be always capable to regenerate them preserving the sequence of elements due to the nature of flooding. If the sequence of elements is changed, semantics of the packet can be altered and potential signatures used for authentication invalidated.

4) Most issued consequent link state update packet versions carry only changes in contents of the list elements (such as e.g. amount of a resource available for a link) and do not change structure of the packet significantly (such as e.g. adding or removing links).

5) Changing the structure of the packets implies significant change in the internal state of the protocol and processing load such as e.g. removal of a element representing a link makes necessary to recompute the internal reachabilities in the networks. Contrary to that update of internal information carried in the elements, e.g. metrics of a link, does less often represent changes significant to the state of the protocol.

| | | |
|---|---|---|
| Method Description | | |
| Notation | | |
| LISTS | | |
|     DEFINITION | | |
| | 1 | A list of elements (such lists and orders of complexity of different operations thereon are well-known in computer science and have been described in many places such as (Knuth, "The Art of Computer Programming"; R. Tarjan, "Data Structures & Network Algorithms", Bell Laboratories, 1991, ISBN 0-89871-187-8) |
| | 1.el_x | Element x of a list 1 |
| | 1.el_x[NEXT] | Next element after element el x in the list 1 |
| | 1.el_x[PREV] | Previous element before element el x in the list 1 |
| | 1.el_x.kids | List of pointers to elements being children of x (embedded into x) |
| | 1.el_x.kidsTree | Tree of duplicate lists (defined later) of children of x |
| | 1.el_x.property | The element can be marked with the 'property' USED or NOT_USED. |
|     OPERATIONS | | |
| | LENGTH (1) | returns number of elements in list 1 |
| | INSERT (1,el_x,el_y) | inserts element x into list 1 before element y |
| | REMOVE (1,el_x) | removes element x from list 1 |
| | FIRST (1) | returns pointer to first element on the list 1 |
| | POINTER (el_x) | returns the pointer to element x, abbreviated as &el_x |
| | FREE (el_x) | destroys the element x |
| | el_x:=el_y | updates content of element x with the contents of element y. Invalid if not el_x==el_y (defined later) |
| | el_x==el_y | content of element x is equal to content of element y. Additionally, the contents, sequence and number of embedded kids in x is equal to contents, sequence and number of embedded kids in y. |
| POINTERS | | |
|     DEFINITION | | |
| | *p | A pointer p to an element of a list |
| | NULL | Undefined pointer value |
|     OPERATORS | | |
| | CONTENT (p) | content of the element p points to, abbreviated as *p |
| | p1=p2 | true if p1 points to the same element as pointer p2 |
| | p1!=p2 | true if not p1=p2 |
| | PRIMARY KEY ORDERING | Such an ordering is always given due to the fact that different elements present different types of information such as e.g. links or nodes. Elements of the same type can be again identified by unique fields differentiating them like link or node IDs. However, the algorithm works even if the ordering is 'weak' and creates duplicates. However, high ratio of duplicates (in terms of the ordering being equal elements) causes leaves of the tree to degenerate to lists and weakens the advantage of the algorithm. |
| | # | Total ordering for the elements |
| | el_1=<el_2 | True if el_1#el_2 is defined |
| | el_1>=el_2 | True if el_1#el_2 is defined |
| | el_1=el_2 | el_1=<el_2 and el_1>=el_2 |

| | -continued |
|---|---|
| el_1<el_2 | el_1=<el_2 and not el_1=el_2 |
| el_1>el_2 | el_1>=el_2 and not el_1=el_2 |
| LISTS OF DUPLICATES | |
| DEFINITION | |
| 1' | A non-empty list of pointers to elements where for x in 1', for each y in 1' *x=*y is true |
| OPERATIONS | |
| # | Total ordering of duplicate lists. 1'_1#1'_2 is defined as equivalent to *FIRST(1'_1)#*FIRST(1'_2) |
| TREES | |
| t# | Binary tree or other kind of unbalanced or balanced sorted tree (such trees and orders of complexity of different operations thereon are well-known in computer science and have been described in many places such as (Knuth, "The Art of Computer Programming"; R. Tarjan, "Data Structures & Network Algorithms", Bell Laboratories, 1991, ISBN 0-89871-187-8)) of lists of pointers to duplicates using ordering #, abbreviated as t |

As a simple example, such a tree can be imagined as a binary tree, i.e. a tree where each node consists of a pointer to the element contained and a 'left' and 'right' pointer. The 'left' pointer points to a tree leaf which contains a smaller element and the 'right' pointer to a leaf with a bigger element. As an example given here schematically

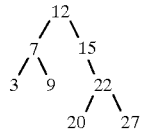

can be used. Such trees are used to reduce the order of search operations. Compared to an unsorted list of N elements where a search operation on average takes N/2 compares, finding an element on a balanced tree (balanced means that the number of elements on the left and right side of the root is roughly the same where such a condition can be assured using appropriate state-of-the-art algorithms) takes LOG_2(N) steps on average.

| INSERT (t, 1') | insert 1' into t |
|---|---|
| REMOVE (t, 1') | remove 1' from t |
| FIND (t, 1') | find list 1' on t |

| COMPLEX OPERATIONS | |
|---|---|
| MOVE (1,t,*el_x,*el_y) | move pointer to element x before pointer to element y from its current position in the list 1. Set the property of element x on the tree t to USED. |
| INSERT (t,*el_x) | insert pointer to element x into the duplicate list in the tree t. If the duplicate list does not exist, create it first and insert it into the tree. Set property to USED. |

| | -continued |
|---|---|
| REMOVE (t,*el_x) | remove pointer to element x from the duplicate list in the tree t. If the duplicate list becomes empty, remove it from the tree. |
| FIND (t,*el_x,property) | find pointer to an element=el_x on tree t with the requested property. Returns NULL if not on the tree. |

Input

The method accepts as input 'ListOld', the list of pointers to elements being representation of a parsed TLV encoded packet and 'TreeOld', the tree of duplicate lists of pointers to these elements. Each of the elements of the list pointed to contains a list (possibly empty) of pointers to embedded elements and a tree of pointers to these elements at the same time. The list preserves the sequence of the elements (they cannot be resorted) and the tree allows for fast searches to find elements that did not change. All elements have the property NOT_USED set. As second input 'ListNew', the list of pointers to elements representing the new, unparsed packet is provided. The elements of the list do not contain trees of embedded elements and the list is traversed only following the sequence of contained elements thus making it possible to use an unparsed 'raw' packet as input. Such packets are commonly received on interfaces of devices running modern link-state routing protocols as expressed in FIG. 1c.

DECLARATIONS

ListOld: List of pointers to elements;

ListNew: List of pointers to elements;

TreeOld: Tree of duplicate lists;

Output

The method generates from the list representing the previous version of the TLV encoded packet the list representing the new version thereof in a fast, incremental way. The new representation contains in each element the list of embedded elements and the tree thereof as well. This feature makes it possible to use the output of the method as its input when a new version of the packet needs to be incrementally parsed again.

```
Method
    INCUPDATE ( INPUT/OUTPUT  ListOld    : List of pointers to elements;
                INPUT          ListNew    : List of pointers to elements;
                INPUT/OUTPUT  TreeOld    : Tree of duplicate lists; )
    DECLARATIONS
        Found: Pointer To Element;
        InsertP: Pointer To Element;
        RunnerNew: Pointer To Element;
    CODE
        InsetP   :=FIRST (ListOld);
        RunnerNew:=FIRST (ListNew);
        WHILE RunnerNew!=NULL DO
            BEGIN
                Found:=NULL;
                Found:=FIND (TreeOld,RunnerNew,NOT_USED);
                IF Found!=NULL THEN
                    BEGIN
                    IF Found = InsertP THEN
                        BEGIN
                        InsertP := *InsertP [NEXT];
                    ELSE
                        MOVE (ListOld,TreeOld,Found,InsertP);
                        END IF;
                    END IF;
                    IF NOT *Found == *RunnerNew THEN
                        BEGIN
                        *Found:=*RunnerNew;
                        INCUPDATE (  *Found.kids,
                                     *RunnerNew.kids,
                                     *Found.kidsTree );
                        END IF;
                        *Found.property=USED;
                ELSE
                    INSERT (OldList,RunnerNew,InsertP);
                    INSERT (OldTree,RunnerNew);
                    END IF;
                RunnerNew := *RunnerNew [NEXT];
                END WHILE;
            WHILE InsertP!=NULL DO
                REMOVE (OldList,InsertP);
                REMOVE (OldTree,InsertP);
                FREE (InsertP);
                InsertP:= *InsertP [NEXT];
                END WHILE;
```

Example of Operation

This section visualizes using several simple figures the operation of the algorithm given. All cases are covered and only the recursive structure of the algorithm is omitted using the assumption that the contents of the new versions of the elements remained the same as in the old version. This maps into not covering lines 25–30 of the algorithm given above. Additionally the tree TreeOld is shown for the case where all of the primary keys of the contained elements are unique, degenerating therefore into a binary search tree instead into a tree of queues of elements with the same primary keys.

The figures present the data structures of the old, parsed version of the packet in the upper portion of the page and the lower part of the page presents the new, unparsed version of the packet. The parsed version consists of a queue of elements preserving the sequence in the original packet and a tree used for fast searches and bookkeeping of used and unused elements during the update process. The sequence of figures given explains the steps taken by the algorithm and their influence on appropriate structures. The figures themselves show the lists, pointers and packets in a fairly abstract way suited for a fast understanding of the given protocol. Elements for which the relation # holds, i.e. for element 1 of the old packet and for element 1' of the new packet 1=1' is true, are filled with the same pattern. Said in a slightly oversimplified way, elements with the same pattern are the 'same' ones.

Figure 1E:
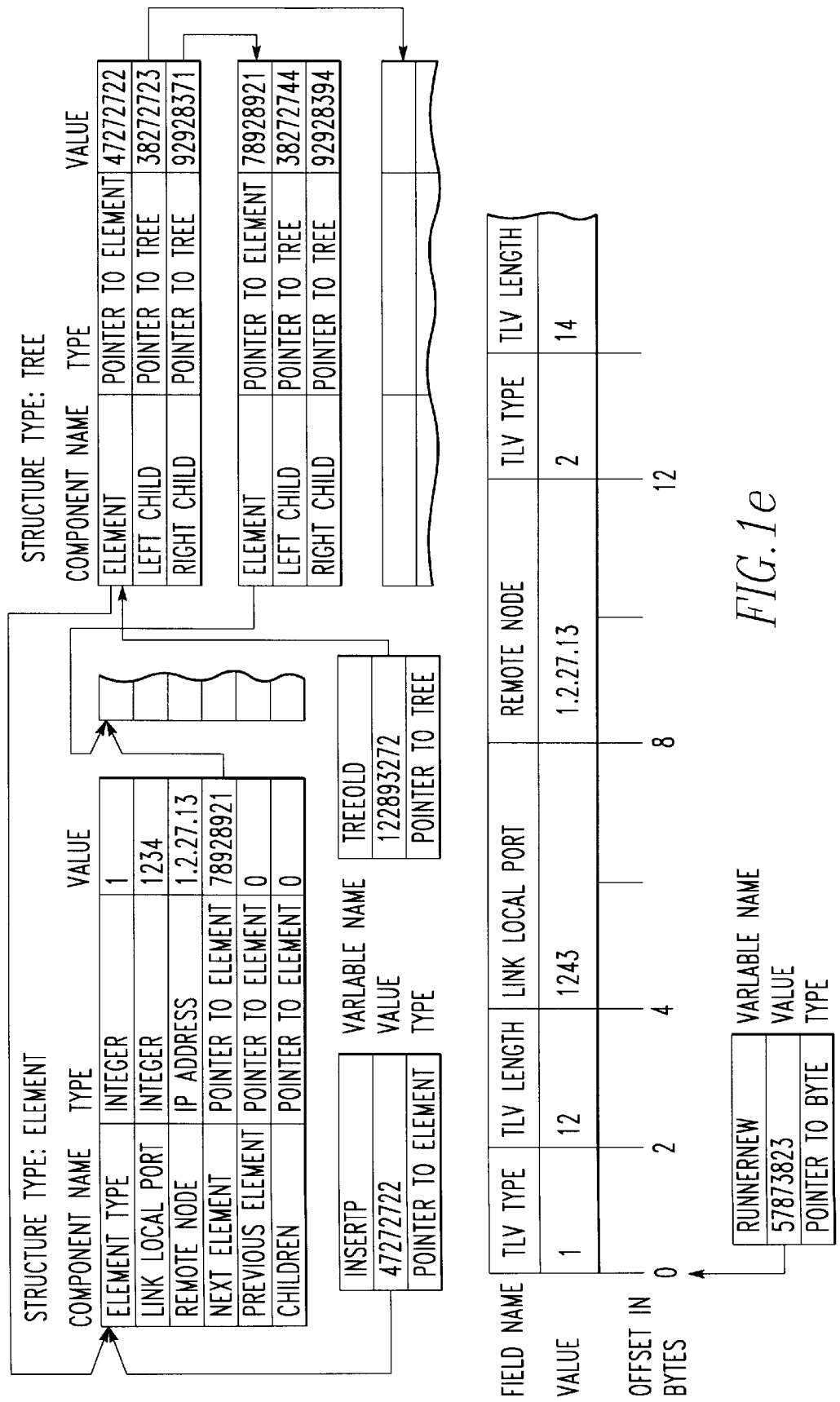
FIG. 1e is a schematic representation of a possible memory structure associated with the present invention.

FIG. 1a visualizes a part of FIG. 1e as possible interpretation through actual structures in the memory of a computer. Structures of the type 'Element' are a possible link representation in a link-state protocol. A link is uniquely identified therein by a port and the remote node it points to and by the value of the 'Element Type'-component. To build a list of elements both components 'Previous Element' and 'Next Element' are used. Since the lists are recursive, a component 'Children' is defined in each structure to point to a possible list of embedded elements. The indexing structure, named 'Tree' here is rather simple and consists of the pointer to the indexed element and two pointers 'Left Child' and 'Right Child' to form a binary tree for fast searches. The lower part of the figure visualizes the newly arrived version of the packet, not parsed and therefore represented in computer memory as sequence of bytes. Element of type 1 being identical to the first element stored in the queue in the upper part of the figure can be recognized, followed by a next element of type 2. Finally, different variables, functioning as pointers in the algorithm, are shown as pointers to appropriate types.

Referring to FIG. 1b, the start situation where the old, parsed version of the packet contains 4 elements with no children enclosed in the father element 1 is presented. The queue of elements and the tree structure used for searches are shown. All elements are "unused" for the update process and therefore tree elements point to according list elements. Both pointers "InsertP" and "RunnerNew" of the algorithm are initialized to the first elements of the appropriate packet versions. In this figure the case is covered where an element of the new packet is found on the list and at the same place in the old packet. The algorithm evaluates branches in lines 16 and 18 as true. FIG. 2 shows the situation after the processing of the first element in the new packet version. Nothing in the old packet has changed except that the element of the tree TreeOld is not used any more for searches by changing its property to USED. The figure indicates this fact by the missing pointer into the list of elements. This figure encounters the case where a completely new element is found in the new version of the packet and inserted before InsertP and onto the tree. This manifests itself in the algorithm by the branch in line 16 being evaluated as false.

FIG. 3 shows the data structures thereafter and introduces a case where a known element appears at a new place in the packet. The branch in the line 16 is true and in line 18 false. The moved element 1.3 is marked with the property USED on the tree.

FIG. 4 covers the case equivalent to FIG. 1.

Figure 5:
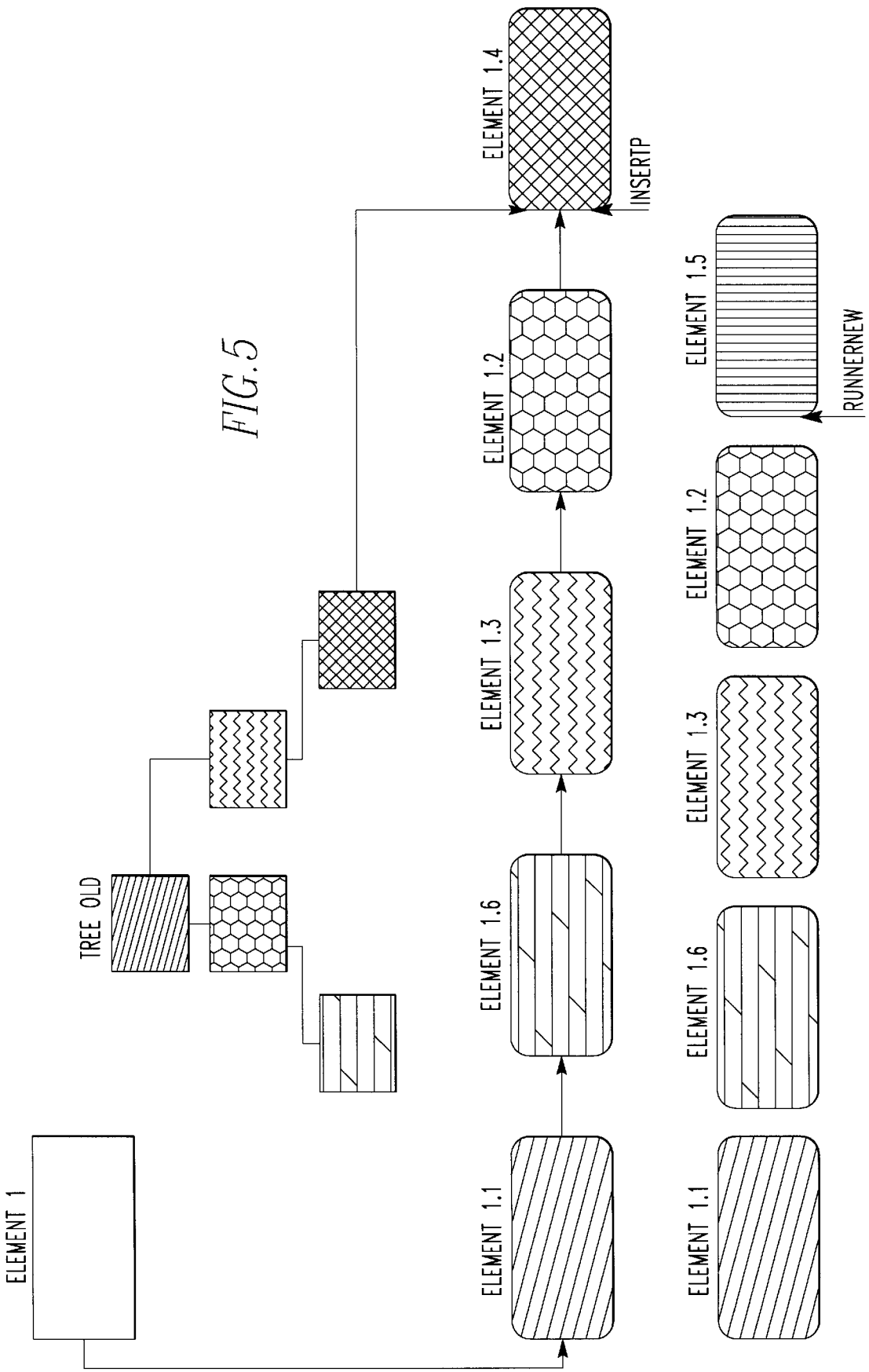
FIG. 5 is a schematic representation of an old packet compared to a new packet where the element compared is a new element at the end of the new packet.

FIG. 5 covers the case equivalent to FIG. 2.

FIG. 6 shows the function of the loop starting at line 39. Any elements in the old packet that do not exist anymore in the new version were pushed out to the end of the list and will be deleted now. In this case, only element 1.4 needs to be removed from the list and the tree as well.

Figure 7:
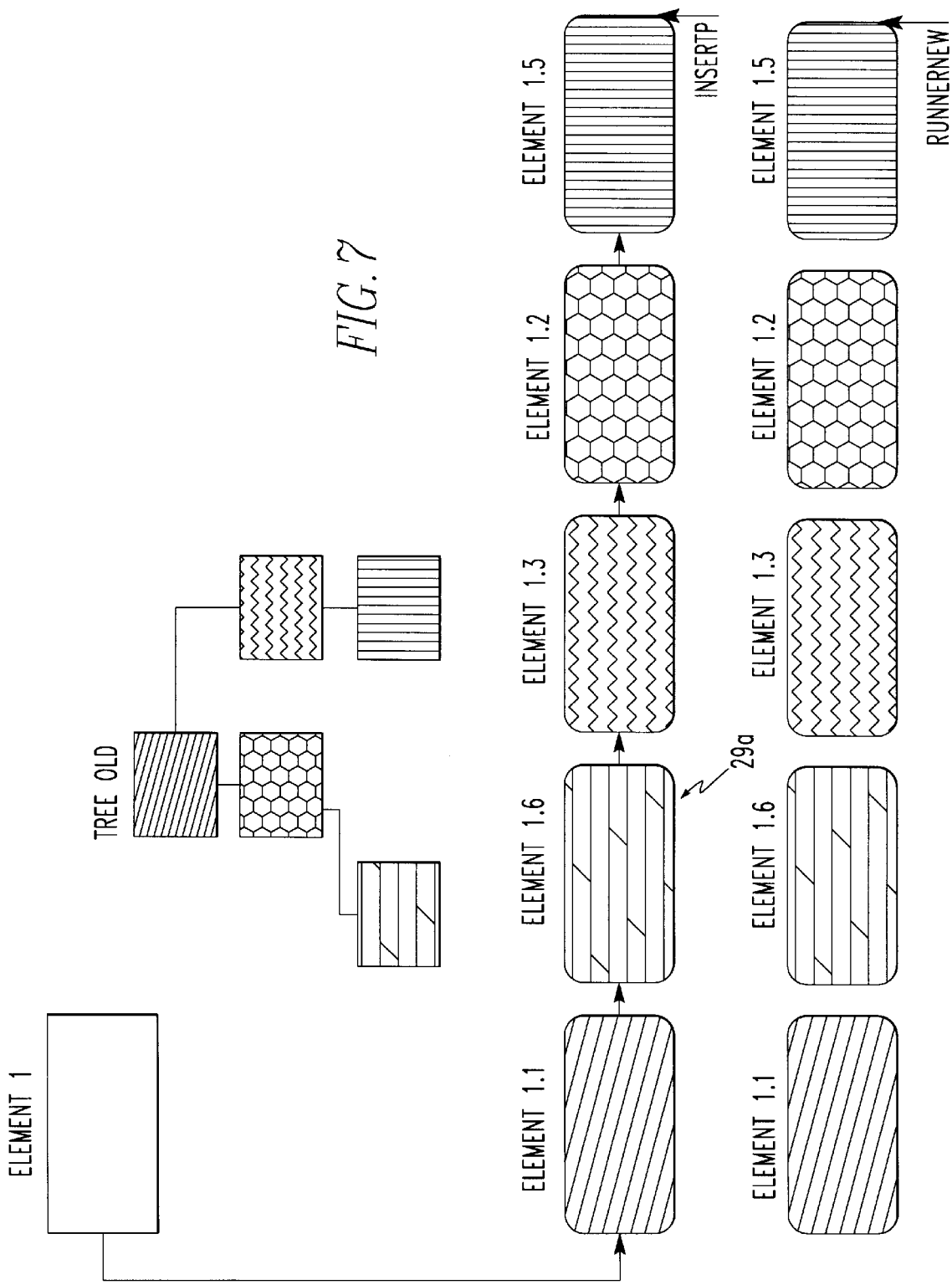
FIG. 7 is a schematic representation of an old packet compared to a new packet where the old packet is identical with the new packet after incremental conversion has been completed.

FIG. 7 shows the data after the algorithm ended. The list represents the structure of the new packet, all elements are on the tree TreeOld and marked USED.

Optimization for packets arriving in sequence

In a network using a link-state protocol and operating under normal conditions the subsequent versions of link state packets arrive in sequence without gaps. Assuming that, the comparison in line 25 can be abbreviated when every version of a link-state packet sets a bit in each element describing whether the element itself or any of elements embedded into it have changed since the last version. Instead of comparing e.g. byte-wise the contents of the same elements in the two version, only a bit has to be checked which can improve the performance of the parser significantly.

The following are some additional possible applications of the above-described algorithm.

1. The method applied in link-state routing protocols in particular and generally in any computer application using lists of lists. In this instance, there is no need for an additional node or computer. In the node itself or the computer itself, there is a list. The list is stored in a memory in the node or the computer in some form of data structure. When a new list comes in and the node or computer needs to determine how the new list is different from the list already in the memory of the node or the computer, the algorithm described above updates the elements of the old list with the elements of the new list by incrementing the elements of the old list with the elements of the new list as described above. For instance, instead of packets containing information about other nodes or computers in a network, the list can contain information concerning a computer aided drawing and a new list can be received by the node or computer having computer aided drawing information. The new list can then be used to update the old list by incrementing the old list with the new list in essentially the same way as the packet information explained above is implemented or updated.

2. Using the method with extension to packet formats indicating when packet versions arrive in sequence that an element and all embedded elements have not been changed or which thereof changed. As in the previous additional possible application described, there need only be one node or computer which contains the above-described algorithm. In this instance, the algorithm is used to determine whether any aspect of the element is changed by, for instance, looking at a byte at a certain location in the packet which identifies whether the associating element or elements with the byte is different from an element or elements already present of a packet in the memory of a node or computer. If the byte has a value which indicates there is no change, then the algorithm proceeds immediately to the next byte of the next element or elements. If the byte indicates that there is a change in the element, then the algorithm can proceed to compare the new element or elements with the existing element or elements and updating the old element or elements by incrementing the old element or elements with the new element or elements. In this way, the examination of an element or elements can be accelerated, for instance, by a switch.

3. Using the method with two trees instead of the USED property where each element found in line 15 is copied onto a new tree and deleted from TreeOld instead of changing the property. At the end of the algorithm the new tree replaces the empty TreeOld. In certain scenarios where tree inserts and deletes are very inexpensive but searches cost a lot when trees are big, this art can improve the algorithm.

4. Using the method with hashes or other types of indexing structures instead of trees to achieve fast search & comparison of the elements. (Knuth, "The Art of Computer Programming", Adis. Wesl. '73). In this instance, the use of hashes or other types of indexing structures replaces the binary tree in the algorithm for the best search and comparison of the elements under review. This can occur for any type of list or packetized information with elements whether it be in regard to a group of nodes or computers or a single node or computer.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for monitoring a node comprising the steps of:

storing an old packet from another node having at least a first element and at least a second element which is in the order that follows the first element of the old packet in a memory of said node;

receiving by the node a new packet from said another node having at least a new packet first element, the new packet has at least a new packet second element which is in the order that follows the new packet first element of the new packet;

comparing the new packet first element of the new packet with the first element of the old packet;

comparing the new packet second element of the new packet with the second element of the old packet; and inserting the new packet first element of the new packet in an order which is in front of the first element of the old packet in the memory if the new packet first element of the new packet is different than the first element of the old packet while maintaining the first element of the old packet in the memory.

2. A method for monitoring a node comprising the steps of:

storing an old packet from another node having at least a first element and at least a second element which is in the order that follows the first element of the old packet in a memory of said node;

receiving by the node a new packet from said another node having at least a new packet first element, the new packet has no additional element which is in the order that follows the first element;

comparing the new packet first element of the new packet with the first element of the old packet;

deleting the second element of the first packet from the memory; and inserting the new packet first element of the new packet in an order which is in front of the first element of the old packet in the memory if the new packet first element of the new packet is different than the first element of The old packet while maintaining the first element of the old packet in the memory.

* * * * *